US011603186B2

(12) United States Patent
Wood et al.

(10) Patent No.: US 11,603,186 B2
(45) Date of Patent: Mar. 14, 2023

(54) REMOVABLE PASSIVE AIRFLOW OSCILLATION DEVICE AND SYSTEM

(71) Applicant: Textron Innovations Inc., Providence, RI (US)

(72) Inventors: William B. Wood, Weatherford, TX (US); Lawrence M. Corso, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 814 days.

(21) Appl. No.: 16/248,197

(22) Filed: Jan. 15, 2019

(65) Prior Publication Data

US 2020/0223534 A1 Jul. 16, 2020

(51) Int. Cl.
*B64C 21/04* (2006.01)
*B33Y 80/00* (2015.01)
*F16D 1/00* (2006.01)
*F15D 1/00* (2006.01)

(52) U.S. Cl.
CPC .............. *B64C 21/04* (2013.01); *B33Y 80/00* (2014.12); *F15D 1/0025* (2013.01); *F15D 1/0065* (2013.01); *B64C 2230/18* (2013.01)

(58) Field of Classification Search
CPC ..... B64C 21/04; B64C 2230/18; B33Y 80/00; F15D 1/0025
See application file for complete search history.

(56) References Cited

U.S. PATENT DOCUMENTS

| | | | | |
|---|---|---|---|---|
| 5,791,601 A | * | 8/1998 | Dancila | B64C 23/00 416/20 R |
| 8,382,043 B1 | * | 2/2013 | Raghu | F15D 1/008 244/1 N |
| 2017/0349268 A1 | * | 12/2017 | Duffy | B64C 21/08 |
| 2018/0243950 A1 | * | 8/2018 | Lyons | B29C 41/003 |
| 2018/0370617 A1 | * | 12/2018 | Raghu | B64C 21/04 |
| 2020/0017199 A1 | * | 1/2020 | Leung | F15D 1/002 |
| 2020/0248563 A1 | * | 8/2020 | Thomas | B64C 27/467 |

FOREIGN PATENT DOCUMENTS

WO WO-2017069840 A1 * 4/2017 ............. B64C 21/04

* cited by examiner

*Primary Examiner* — Joshua D Huson
*Assistant Examiner* — Shanna Danielle Glover
(74) *Attorney, Agent, or Firm* — Whitaker Chalk Swindle & Schwartz PLLC; Enrique Sanchez, Jr.

(57) ABSTRACT

A removable passive airflow oscillation device can be disposed within a pressurized wing structure utilized as a plenum. The passive airflow oscillation device can be a removable insert disposed into exterior vehicle surfaces with pressurization of a sealed chamber to provide the airflow. The device can include a cavity configured to receive the airflow from an ingress opening, direct the airflow therethrough to generate a predetermined oscillating airflow, and expel the oscillatory airflow from the egress opening. The removable passive airflow oscillation devices can provide quick and simple replacement and maintenance of damaged or clogged devices. The aft chamber of the flap seal can be sealed and pressurized to serve as a plenum providing the airflow to the actuators. The device can receive airflow, such as compressor air, and expel an oscillating airflow. Because each device is self-contained the number of devices and location thereof can vary by application.

19 Claims, 4 Drawing Sheets

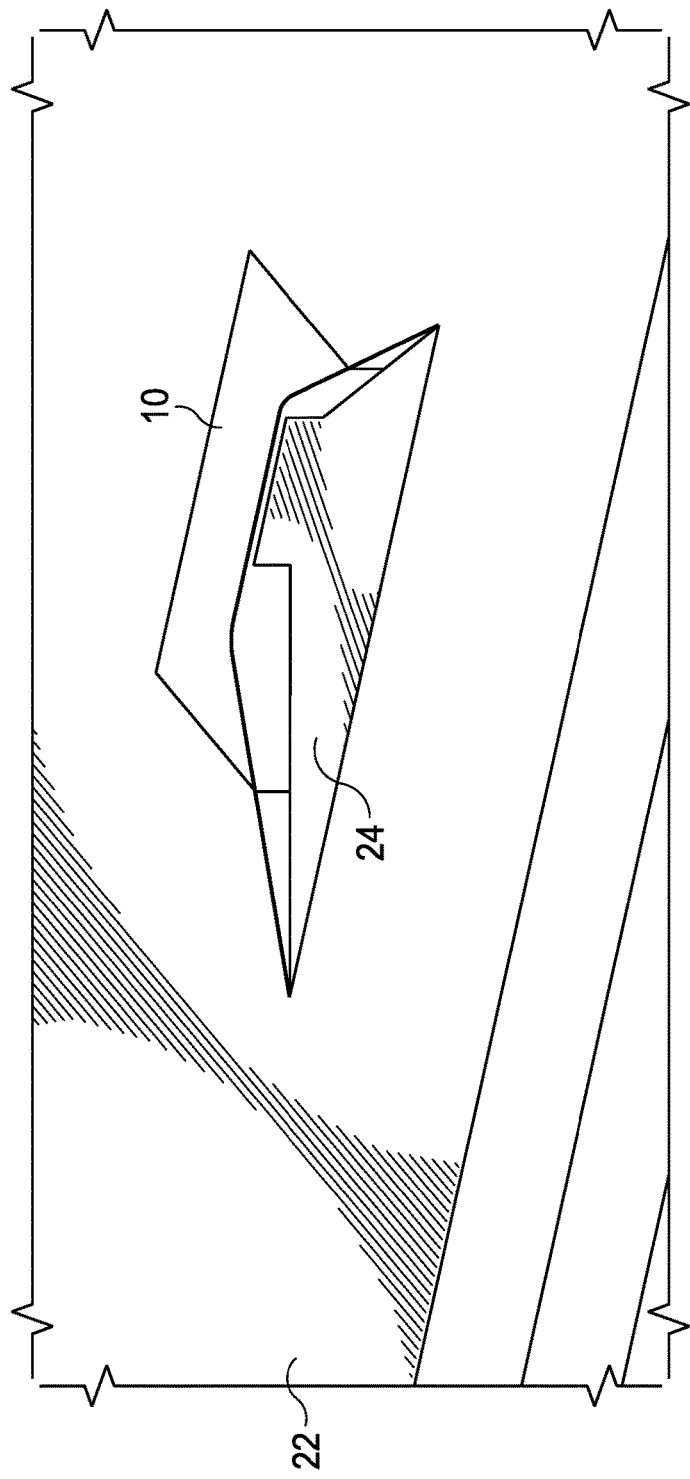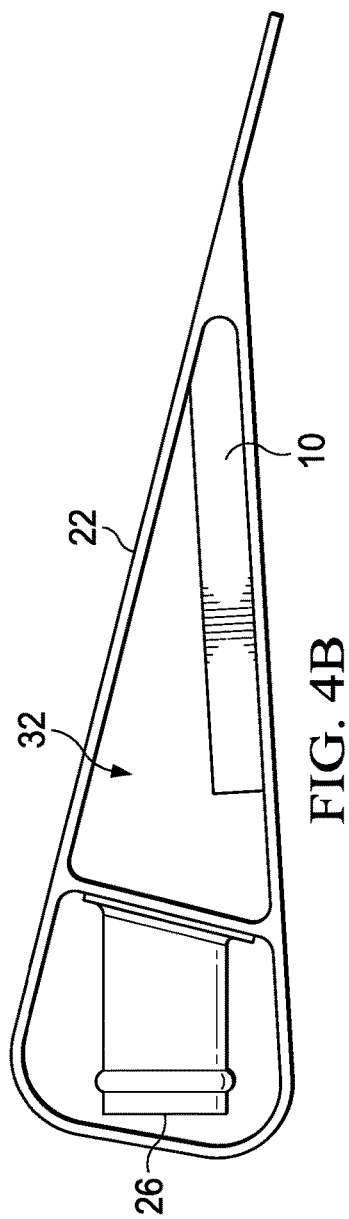
FIG. 4A
FIG. 4B

REMOVABLE PASSIVE AIRFLOW OSCILLATION DEVICE AND SYSTEM

STATEMENT REGARDING FEDERALLY SPONSORED RESEARCH

This invention was made with government support under N00014-17-C-1019 awarded by the Office of Naval Research. The government has certain rights in the invention.

BACKGROUND

1. Field of the Invention

The present disclosure is generally related to airflow oscillation devices, and more specifically to airflow oscillation devices removably integrated into a pressurized airframe structure.

2. Background of the Invention and Description of Related Art

Aircraft are getting heavier and heavier as more and more technology is incorporated. As such, there is typically a one-to-one relationship between system weight and hover performance—as system weight increases, hover performance decreases (i.e., the amount of useful load the aircraft can lift). In tiltrotor applications, the rotors can create a downwash of airflow that pushes air against the wing reducing the aircraft's lift capabilities. Basic wing design can include a wing, a flaperon, and a flap seal that can bridge the gap between the wing and the flaperon. While in hover mode, wing flaps are generally rotated in the down position to minimize download effects. As airflow washes down from the rotor the air can be pushed in both directions (fore and aft) around the wing and over a flap. This airflow can result in the separation of the air over the rotated flap, thereby increasing the download by creating drag. By energizing airflow over the flap, the airflow can remain attached, which decreases drag and increases aircraft hover performance (e.g., increased lift capacity) due to lower download effects.

Active flow control (AFC) systems can produce momentum or mass flow fields to control the airflow. AFC actuators can control airflow mixing and energize the boundary layer to control flow separation when implemented on the wing of an aircraft. AFC has been shown to keep airflow attached, reducing download and increasing aircraft performance. Debris, such as bugs, dust, and mud, among others, can clog the actuators and reduce or eliminate airflow therethrough. Large blocks having multiple actuators would make it difficult to inspect, identify, clean, and/or replace individual actuators.

Previous attempts at providing AFC systems typically included a large aluminum block having a plurality of actuators machined therein. The large aluminum block could then be incorporated into an airframe structure. By way of example, U.S. Pat. No. 8,382,043, is directed to the manufacture and use of an aerodynamic flow control device with an array of actuators built into a device block. The array of fluidic actuators disclosed by Raghu may be designed to produce oscillating or pulsed jets at the exit ports with frequencies in the range of 1-22 kHz. The compact array of fluidic actuators can be integrally manufactured along with the wing sections, flaps, tail and rudder of airplane, the inlet or exit geometries of a jet engine. When supplied with a source of fluid, such as pressurized air, these arrays of actuators produce a set of fluid jets of random phase of high velocity and influence the main stream of air over the subject surface. It is apparent from reading Raghu that the design of the array of fluidic actuator oscillators are structurally and functionally different from the fluidic actuators of the present invention. For example, Raghu's invention is built into a device having an array of actuators, such actuators are neither removable nor independently positionable. As a block having an array of multiple actuators, the material between each actuator is wasted as dead weight. Additionally, Raghu's array of actuators are not disposed within a pressurized wing structure that can be utilized as a plenum to increase airflow velocity and mitigate airflow separation.

SUMMARY

The present disclosure teaches technical advantages as a removable passive airflow oscillation device and can be disposed within a pressurized wing structure utilized as a plenum. The passive airflow oscillation device can be a removable insert disposed into exterior vehicle surfaces with pressurization of a sealed chamber to provide the airflow. The device can include a cavity configured to receive the airflow from an ingress opening, direct the airflow therethrough to generate a predetermined oscillating airflow, and expel the oscillatory airflow from the egress opening. The removable passive airflow oscillation devices can provide quick and simple replacement and maintenance of damaged or clogged devices. The aft chamber of the flap seal can be sealed and pressurized to serve as a plenum providing the airflow to the actuators. The device can receive airflow from a compressor source and expel an oscillating airflow. Because each device is self-contained the number of devices and location thereof can vary by application.

The removability of individual actuator devices facilitate the replacement and/or repair of worn or clogged devices. The aft cavity can be pressurized through one or more pressure ports that can be mounted to a spar wall. Air can be expelled by the pressure ports into a cavity, thereby pressurizing the cavity and facilitating the expulsion of the airflow into the device input and out of the device output. Pressure differentials between the input and output, as well as the periodic nature of the flow within the device cause the airflow to oscillate as it exits the device.

A plurality of oscillation devices can be disposed in the flap sections (trailing edges) of a wing. To help decrease weight and cost of the component the oscillation devices can be 3-D printed using Polyetherimide (PEI) or polyaryletherketone (PAEK) material to withstand high temperatures while maintaining mechanical strength, as compressors can cause the airflow to be heated to over 250° Fahrenheit. The oscillation devices can also be made of metal, such as aluminum. The device can be operably disposed within the wing of an aircraft, a wing flap, a tail rudder or flap, an aircraft inlet, or an aircraft engine intake. For example, the removable oscillation device can be disposed at various locations along the wing or aircraft fuselage.

Accordingly, one embodiment of the present disclosure can include a removable airflow oscillation device, comprising: a body having an ingress opening and an egress opening; and a cavity disposed within the body and configured to receive an airflow from the ingress opening and expel an oscillatory airflow from the egress opening, wherein the body can be configured to be inserted into an externally-accessible device slot on an exterior of a vehicle. A protrusion can extend from a first side of the body. The protrusion can be configured to essentially continue the sweep angle of an external wall of the vehicle, or otherwise conform with the exterior of the vehicle. The vehicle can be an aircraft or rotorcraft. The second side of the body can be a removable panel. The device slot can be disposed in a flap seal of an aircraft. The oscillation device can be 3-D printed using high-temperature thermoplastic material, such as Polyetherimide (PEI), polyaryletherketone (PAEK), or other suitable material. The oscillation device can also be made of metal, such as aluminum, steel, titanium, or other suitable material.

Another embodiment of the present disclosure includes a removable airflow oscillation system, comprising: an oscillation device, including a body having an ingress opening and an egress opening; a cavity disposed within the body and configured to receive an airflow from the ingress opening, oscillate the airflow, and expel the oscillatory airflow from the egress opening; and an aircraft having one or more externally-accessible device slots on its exterior, the device slots configured to removably receive the body. The device slot can be disposed in a wall of a chamber. The chamber can be configured to removably receive the body. The chamber can be sealed and pressurized to serve as a plenum providing the airflow to the egress opening of the body. A protrusion can extend from a first side of the body. The protrusion can be configured to essentially continue the sweep angle of an external wall of the aircraft. The protrusion can be configured to essentially continue a shape of an external wall of the aircraft. The external wall can continues the shape of the egress opening to maintain a sweep angle. The second side of the body can be a removable panel. The chamber can be disposed within a flap seal of an aircraft or similar structure. The oscillation device can be 3-D printed using high-temperature thermoplastic material, such as Polyetherimide (PEI), polyaryletherketone (PAEK), or other suitable material. The body can also be made of metal, such as aluminum, steel, titanium, or other suitable material.

BRIEF DESCRIPTION OF THE DRAWINGS

FIG. 4A is a perspective view of a removable airflow oscillation device fully-disposed in a device slot of a flap seal, in accordance with an embodiment of the present disclosure; and FIG. 4B is a cross-sectional, side view of a removable airflow oscillation device disposed in a flap seal, in accordance with an embodiment of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1A:
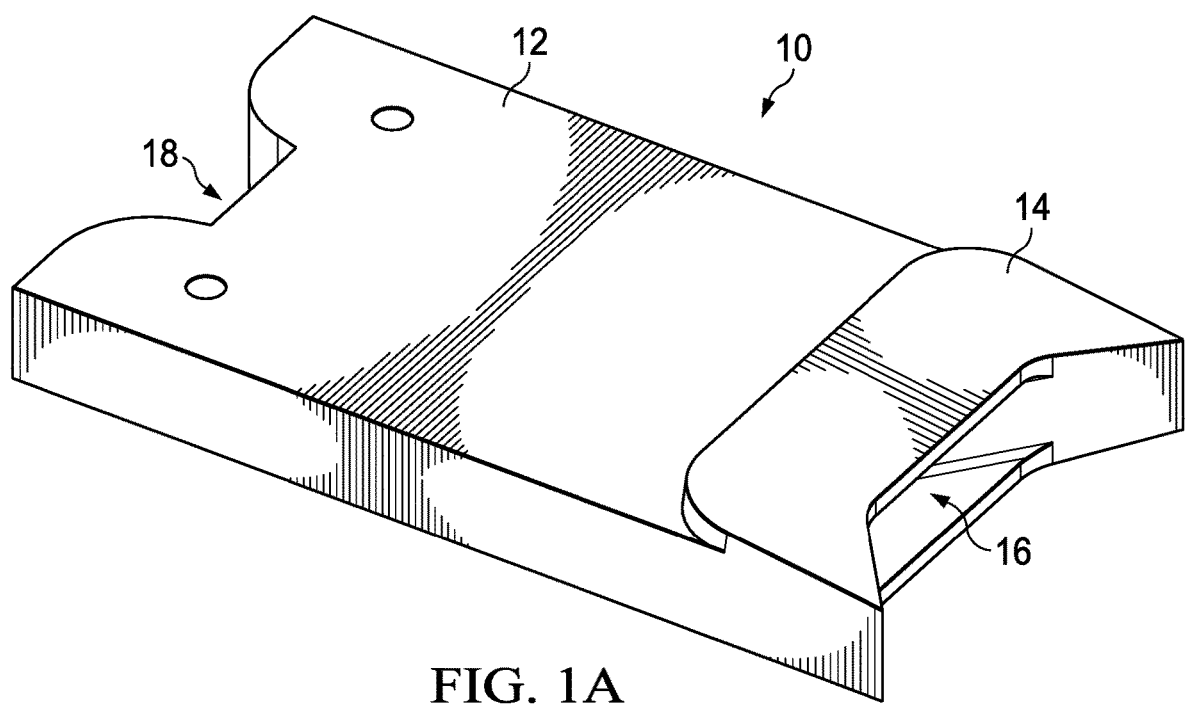
FIG. 1A is a perspective view of a removable airflow oscillation device, in accordance with an embodiment of the present disclosure.

FIG. 1A is a perspective view of a removable airflow oscillation device, generally designated as 10, in accordance with an embodiment of the present disclosure. A removable airflow oscillation device 10 can include a body 12, a protrusion 14, an ingress opening 18, and an egress opening 16. In one embodiment, the body can be generally rectangular. Alternatively, the body can be any suitable shape.

Figure 1B:
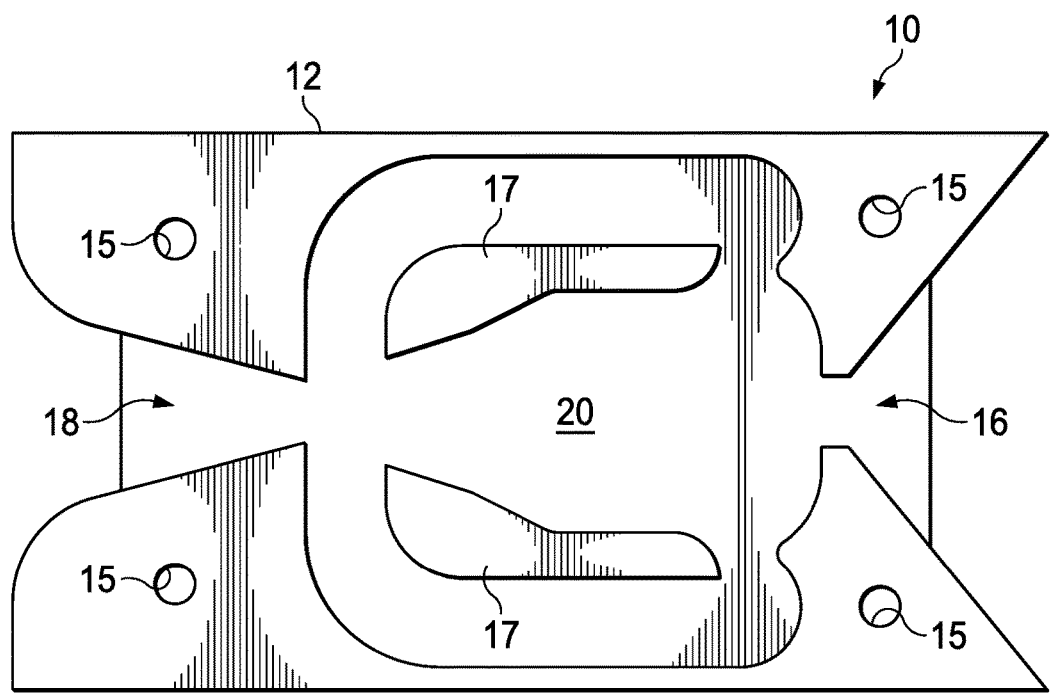
FIG. 1B is a top view of a removable airflow oscillation device, in accordance with an embodiment of the present disclosure.

Advantageously, the body 12 can be configured to be removably inserted into an externally-accessible device slot on an exterior of a vehicle. In one embodiment, the device slot is sized and shaped to receive the body 12 of the oscillation device 10. The protrusion 14 can extend from a first side of the body 12. The protrusion 14 can prevent the oscillation device 10 from passing through the device slot. The protrusion 14 can be a flange, lip, bump, or other suitable protrusion. In one embodiment, the protrusion 14 can come into sealing contact with the exterior of a vehicle to create an air-tight seal. The protrusion 14 can be formed or configured to essentially continue the sweep angle or shape of an external wall of the vehicle, or otherwise generally conform with the exterior of the vehicle. Such general conformance of the protrusion with the exterior of the vehicle can mitigate drag on the vehicle or have an aesthetic effect. The vehicle can be an aircraft, rotorcraft, or other suitable vehicle. The second side of the body 12 can be a removable panel. The removable panel can be a flat sheet of plastic, metal, or other suitable material. The panel can be coupled to the body 12 via screws, nails, adhesive, rivets, or other suitable attaching mechanism. The body 12 can include one or more fastener holes 15. In one embodiment, the panel can be removed from the body 12 as shown in FIG. 1B. Alternatively, the body can have a unitary body. In yet another embodiment, the removable panel can be formed of a material intended to prevent corrosion of the adjacent materials.

The device slot can be disposed in an exterior of a vehicle. The device slot can be machined into an exterior of a vehicle. Accordingly, the oscillation device 10 can be retrofittably incorporated into legacy components. The device slot can include grooves, rails, or other types of receiving mechanisms to receive the oscillation device 10. In one embodiment, the device slot can be disposed in a flap seal of an aircraft. In another embodiment, the device slot can be disposed in a fuselage of an aircraft. In another embodiment, the device slot can be disposed in an exterior component of a rotorcraft or watercraft. The oscillation device 10 can be 3-D printed, formed of metal or plastic, or formed using any suitable method. The oscillation device 10 can be unitary or assembled using multiple components. The oscillation device 10 can be 3-D printed using Polyetherimide (PEI), polyaryletherketone (PAEK), or other suitable material. The oscillation device can also be made of metal, wherein the metal is aluminum.

FIG. 1B is a top view of the removable airflow oscillation device 10, in accordance with an embodiment of the present disclosure. The body 12 can include a cavity 20, disposed within the body and configured to receive an airflow from an ingress opening 18 and expel an oscillatory airflow from the egress opening 16. In one embodiment, the cavity 20 can route airflow through channels disposed therein to create oscillation, amplification, sweeping, or otherwise manipulate the airflow therethrough. One or more features 17 can be disposed within the cavity 20 to create the channels. Additionally, the walls of the cavity or the features can be curved, shaped, or otherwise deformed to direct the airflow within the chamber. The position and shape of the features 17 and the walls of the cavity 20, can be predetermined to generate the desired type of airflow expelled by the egress opening 16. In one embodiment, the sidewalls of the ingress opening 18 can be tapered or otherwise shaped to direct the airflow into the cavity 20. In another embodiment, the sidewalls of the ingress opening 18 can be rounded or otherwise shaped to provide a smoother airflow transition into the cavity 20. The sidewalls of the egress opening 16 can also be tapered or otherwise shaped to direct the airflow out of the cavity 20.

Figure 2A:
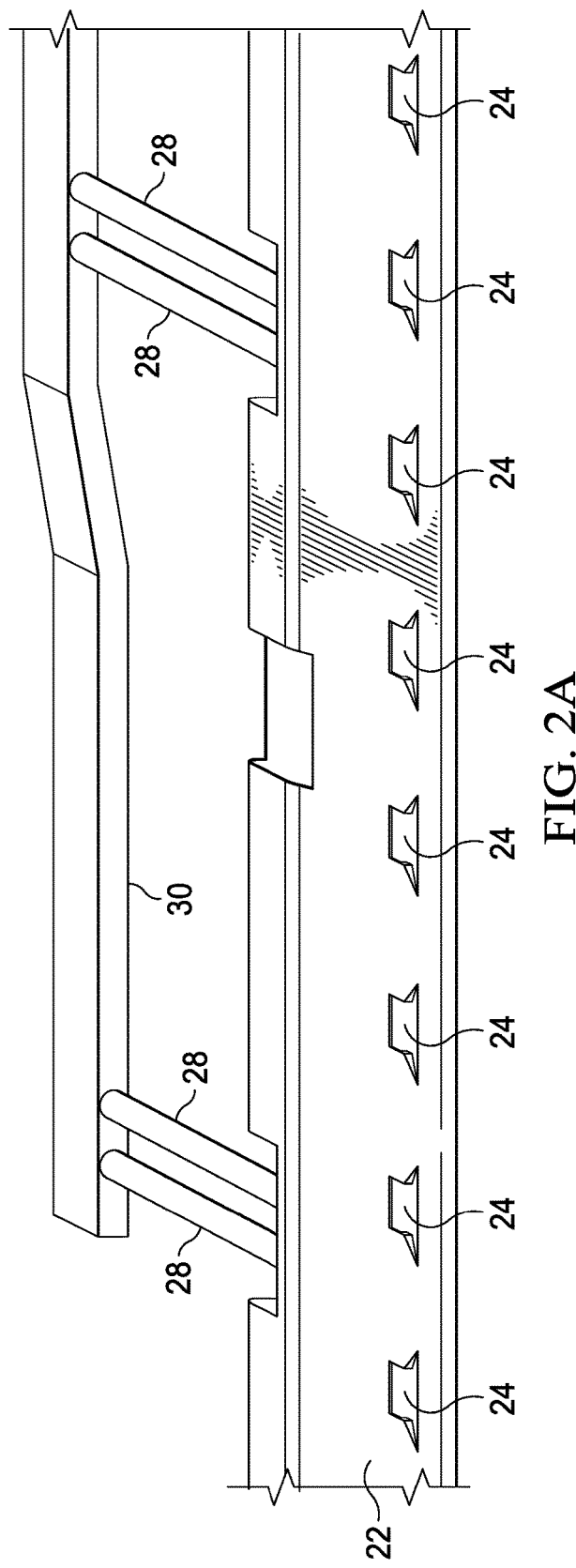
FIG. 2A is a perspective view of a flap seal coupled to an air duct, in accordance with an embodiment of the present disclosure.

FIG. 2A is a perspective view of a flap seal coupled to an air duct, in accordance with an embodiment of the present disclosure. An aircraft can have an air duct 30 disposed therein to provide air pressure to pressurize different parts of an aircraft. The air duct can be operably coupled to an air compressor to regulate the air pressure of the air duct 30. In one embodiment, the aircraft can include a flap seal. One or more transfer tubes 28 can be operably coupled to the air duct 30 and the transfer tubes 28 to fluidly communicate airflow from the air duct 30 through the transfer tubes 28 and into the flap seal 22. The flap seal 22 can include one or more device slots 24. In other embodiments, the device slots 24 can also be disposed in a wing of an aircraft, a wing flap, a tail rudder or flap, an aircraft inlet, an aircraft engine intake, or other suitable exterior location of a vehicle. The device slots 24 can be arranged in any predetermined configuration, at any location on the vehicle, with any suitable spacing. Such configuration, location, and spacing will vary from application to application. The aircraft can have one or more externally-accessible device slots 24 on its exterior, the device slots 24 can be configured to removably receive the body 12 of the oscillation device 10. The device slot 24 can be disposed in a wall of a chamber of the vehicle. The vehicle chamber can be configured to removably receive the body 12 of the oscillation device 10. The chamber can be sealed and pressurized to serve as a plenum providing the airflow to the egress opening 16 of the body 12 of an oscillation device 10.

Figure 2B:
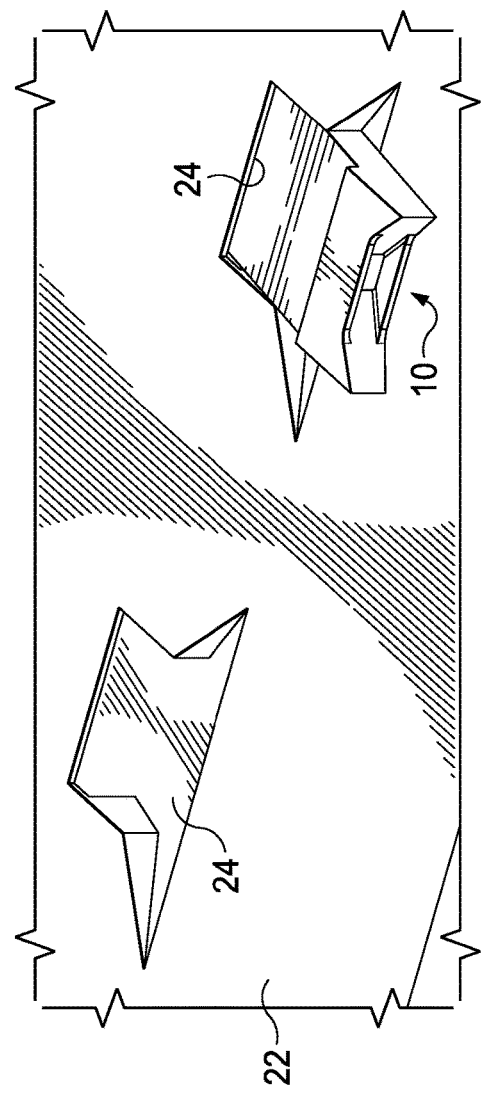
FIG. 2B is a perspective view of a removable airflow oscillation device partially-disposed in a device slot of a flap seal, in accordance with an embodiment of the present disclosure.

FIG. 2B is a perspective view of a removable airflow oscillation device 10 partially-disposed in a device slot 24 of a flap seal 22, in accordance with an embodiment of the present disclosure. The device slots 24 can be configured to receive an airflow oscillation device 10. The airflow oscillation device 10 can be slidably inserted into the device slot 24 of a flap seal 22. FIG. 2B shows an empty device slot 24 next to a device slot 24 with the oscillation device 10 partially-disposed therein. In one embodiment, fasteners can secure the oscillation device 10 within the seal flap 22 from the lower surface.

Figure 3:
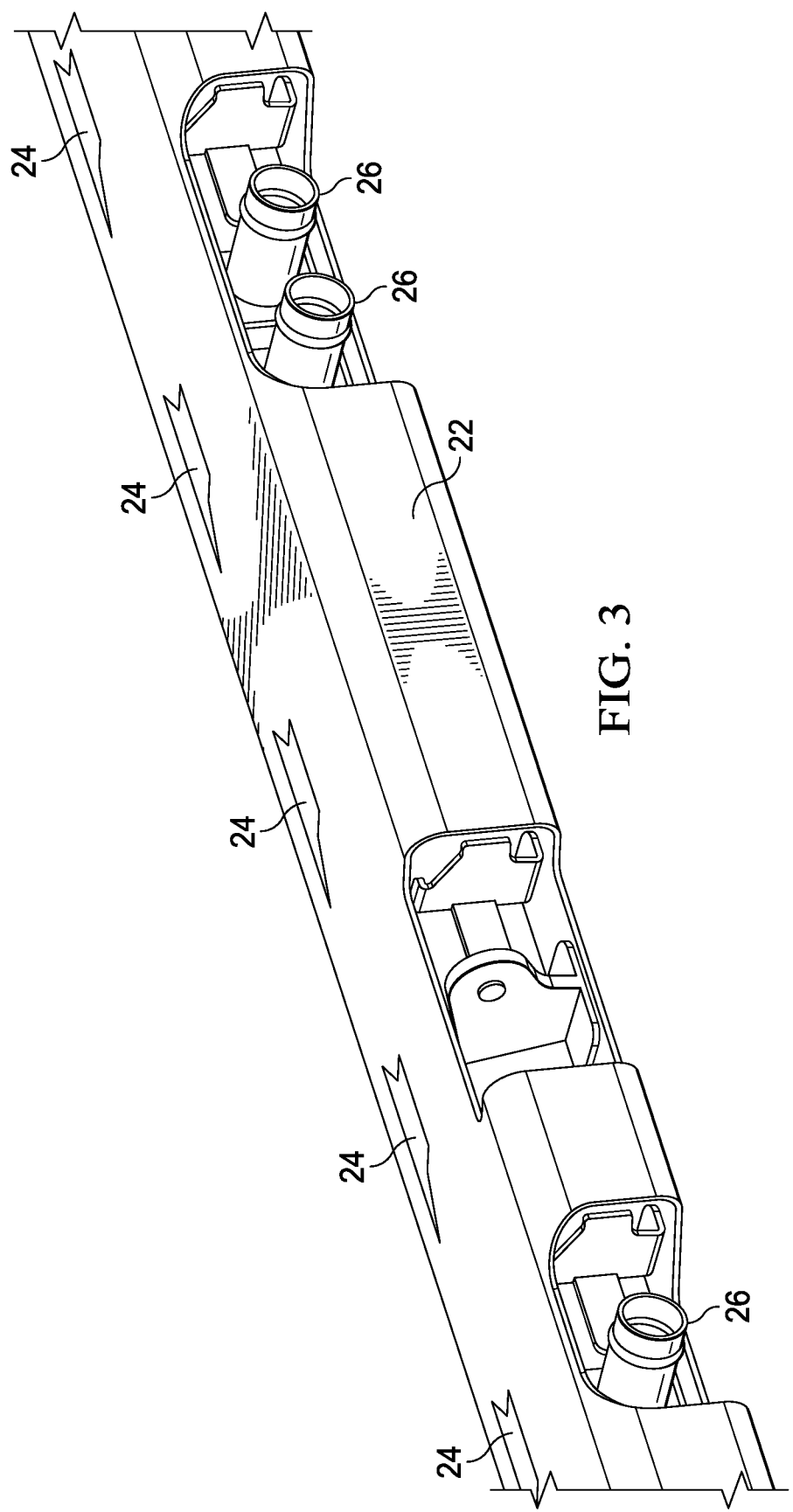
FIG. 3 is a perspective view of a flap seal, in accordance with an embodiment of the present disclosure.

FIG. 3 is a perspective view of a flap seal 22, in accordance with an embodiment of the present disclosure. The flap seal 22 can include one or more cutouts so the transfer tubes can operably couple one or more pressure ports disposed within the flap seal 22. Stiffeners can be disposed within the cutouts to stabilize the cutouts. External plies may be added to retrofitted structure to recover the stiffness reduction from the device slots 24. The pressure ports 26 can be riveted to the forward spar wall of the flap seal 22, or other suitable component. The cutouts can be machined into the flap seal 22 to provide access to an internal chamber, such as an aft cavity. In one embodiment, the pressure ports 26 can be positioned between device slots 24 to improve airflow.

FIG. 4A is a perspective view of a removable airflow oscillation device 10 fully-disposed in a device slot 24 of a flap seal 22, in accordance with an embodiment of the present disclosure. In one embodiment, the sweep angle or shape of the egress opening of oscillation device 10 can be formed or configured to essentially continue the sweep angle or shape into an external wall of the exterior of the flap seal 22, or otherwise generally conform with the exterior of the vehicle. Such general conformance of the oscillation device 10 with the exterior of the vehicle can mitigate drag on the vehicle or have an aesthetic effect. The egress opening of the oscillation device 10 allows the oscillating airflow to be expelled from the oscillation device 10. The expelled oscillating airflow can control airflow separation when implemented on the wing of an aircraft.

FIG. 4B is a cross-sectional side view of a removable airflow oscillation device 10 disposed in a flap seal 22, in accordance with an embodiment of the present disclosure. The oscillation device 10 can be disposed within the flap seal 22 and secured on the bottom side of the flap seal via one or more attaching elements. The pressure port 26 can be operably coupled to the air duct of the aircraft to pressurize the chamber 32 of the flap seal 22.

The present invention achieves at least the following advantages:
1. low-cost removable insert package allows for quick and simple replacement and maintenance of damaged or clogged actuators;
2. integrates airflow oscillation geometry device into wing structure;
3. the removable passive flow device can slide into the flap seal of a wing;
4. the aft cavity of the flap seal can be sealed and pressurized to serve as a plenum providing the airflow to the actuators;
5. retrofittable to existing technologies;
6. without a single point of failure an aircraft can increase its reliability and maintainability; and
7. beneficial reduction of aircraft weight due to the light material utilized in the manufacture of each individual device when compared to prior systems.

While the disclosure has described a number of embodiments, it is not thus limited and is susceptible to various changes and modifications without departing from the spirit thereof. In particular, although a flap seal of an aircraft was disclosed in some of the embodiments and figures described herein, any suitable vehicle component can be utilized. Persons skilled in the art will understand that this concept is susceptible to various changes and modifications, and can be implemented or adapted readily to other types of environments. Further, the individual elements of the claims are not well-understood, routine, or conventional. Instead, the claims are directed to the unconventional inventive concept described in the specification.

What is claimed is:

1. A removable airflow oscillation device, comprising:
a body having an ingress opening and an egress opening;
a cavity disposed within the body and configured to receive an airflow from the ingress opening and expel an oscillatory airflow from the egress opening, wherein the body is configured to be inserted into an externally-accessible device slot on an exterior of a vehicle, wherein the body is individually removable from the externally-accessible device slot without removal of another removable airflow oscillation device; and a protrusion extending from a first side of the body and configured to:

engage in sealing contact with an exterior surface of an external wall of the vehicle to create an airtight seal against the exterior surface of the external wall of the vehicle;

essentially continue a sweep angle of the external wall of the vehicle; and prevent the body from passing entirely through the externally-accessible device slot on the exterior surface of the external wall of the vehicle while the body is being inserted into the externally-accessible device slot.

2. The removable airflow oscillation device of claim 1, wherein the vehicle is an aircraft.

3. The removable airflow oscillation device of claim 2, wherein the aircraft is a rotorcraft.

4. The removable airflow oscillation device of claim 1, wherein the device slot is disposed in a flap seal of an aircraft.

5. The removable airflow oscillation device of claim 1, wherein the oscillation device is 3-D printed.

6. The removable airflow oscillation device of claim 5, wherein the oscillation device is 3-D printed using Polyetherimide (PEI) or polyaryletherketone (PAEK) material.

7. The removable airflow oscillation device of claim 1, wherein the oscillation device is made of metal.

8. The removable airflow oscillation device of claim 1, wherein the body is configured to be slidably insertable into the externally-accessible device slot of the exterior of the vehicle.

9. A removable airflow oscillation system, comprising:
an oscillation device, including:
a body having an ingress opening and an egress opening;
a cavity disposed within the body and configured to receive an airflow from the ingress opening, oscillate the airflow, and expel the oscillatory airflow from the egress opening; and
a protrusion extending from a first side of the body and configured to:
engage in sealing contact with an exterior surface of an external wall of an aircraft to create an airtight seal against the exterior surface of the external wall of the aircraft;
essentially continue a sweep angle of the external wall of the aircraft; and
prevent the body from passing entirely through one or more externally-accessible device slots on the exterior surface of the external wall of the aircraft while the body is being inserted into the one or more externally-accessible device slots; and the aircraft having the one or more externally-accessible device slots on its exterior, the one or more externally-accessible device slots configured to removably receive the oscillation device, wherein the oscillation device is individually removable from the one or more externally-accessible device slots without removal of another removable airflow oscillation device from the one or more externally-accessible device slots.

10. The removable airflow oscillation system of claim 9, wherein the device slot is disposed in a wall of a chamber.

11. The removable airflow oscillation system of claim 10, wherein the chamber is configured to removably receive the oscillation device.

12. The removable airflow oscillation system of claim 10, wherein the chamber is sealed and pressurized to serve as a plenum providing the airflow to the egress opening of the oscillation device.

13. The removable airflow oscillation system of claim 10, wherein the egress opening is configured to essentially continue a shape of the external wall of the aircraft.

14. The removable airflow oscillation system of claim 3, wherein the external wall continues the shape of the egress opening to maintain the sweep angle.

15. The removable airflow oscillation system of claim 10, wherein the chamber is disposed within a flap seal of the aircraft.

16. The removable airflow oscillation system of claim 9, wherein the oscillation device is 3-D printed.

17. The removable airflow oscillation system of claim 16, wherein the oscillation device is 3-D printed using Polyetherimide (PEI) or polyaryletherketone (PAEK) material.

18. The removable airflow oscillation system of claim 9, wherein the oscillation device is made of metal.

19. The removable airflow oscillation system of claim 9, wherein the oscillation device is configured to be slidably insertable into the one or more externally-accessible device slots.

* * * * *